United States Patent
Hysinger et al.

[11] Patent Number: 5,930,284
[45] Date of Patent: Jul. 27, 1999

[54] MULTIPLE INPUT ELECTRODE GAP CONTROLLER

[75] Inventors: Christopher L. Hysinger; Joseph J. Beaman, both of Austin, Tex.; David K. Melgaard; Rodney L. Williamson, both of Albuquerque, Niger

[73] Assignee: Sandia Corporation, Albuquerque, N.M.

[21] Appl. No.: 08/784,334

[22] Filed: Jan. 15, 1997

[51] Int. Cl.$^6$ .............................. H05B 3/60; H05B 7/148
[52] U.S. Cl. .................. 373/50; 373/67; 373/70; 373/105
[58] Field of Search .................. 373/42, 47, 49, 373/50, 67, 70, 102, 104, 105; 364/550

[56] References Cited

U.S. PATENT DOCUMENTS

| | | | |
|---|---|---|---|
| 2,904,718 | 9/1959 | Cooper et al. | 314/73 |
| 2,915,572 | 12/1959 | Buehl | 13/13 |
| 2,942,045 | 6/1960 | Johnson | 13/13 |
| 3,143,587 | 8/1964 | Buehl | 13/13 |
| 3,186,043 | 6/1965 | Murtland, Jr. et al. | 22/200 |
| 3,187,078 | 6/1965 | Murtland, Jr. et al. | 13/13 |
| 3,277,229 | 10/1966 | Oppenheim | 13/13 |
| 3,375,318 | 3/1968 | Kjolseth et al. | 13/13 |
| 3,381,079 | 4/1968 | Murtland, Jr. et al. | 13/13 |
| 3,385,920 | 5/1968 | Harbaugh et al. | 13/13 |
| 3,872,231 | 3/1975 | Motter et al. | 13/13 |
| 4,096,344 | 6/1978 | Munson | 373/105 |
| 4,131,754 | 12/1978 | Roberts | 13/34 |
| 4,303,797 | 12/1981 | Roberts | 13/13 |
| 4,578,795 | 3/1986 | Fisher et al. | 373/70 |
| 4,742,528 | 5/1988 | Stenzel | 373/70 |
| 4,775,981 | 10/1988 | Kohnert et al. | 373/70 |
| 4,797,897 | 1/1989 | Stenzel et al. | 373/105 |
| 5,099,438 | 3/1992 | Gulden, Jr. et al. | 364/550 |
| 5,438,588 | 8/1995 | Wanner | 373/108 |
| 5,621,751 | 4/1997 | Willamson et al. | 373/70 |
| 5,708,677 | 1/1998 | Williamson et al. | 373/70 |
| 5,737,355 | 4/1998 | Damkroger | 373/50 |

OTHER PUBLICATIONS

Williamson, R.L., et al., "Voltage Signatures in VAR," *Proceedings Vacuum Metallurgy Conf.*, N. Bhat, et al., eds., Iron and Steel Society, Warrendate, PA, 1992, pp. 87–91.

Zanner, F.J., "Metal Tarnsfer During Vacuum Consumable Arc Remelting," *Metallurgical Transactions B*, vol. 10B, 1979, pp. 133–142.

Zanner, F.J., et al., "Relationship Between 520 mm Diameter INCONEL 718 Alloy Ingot Pool Profiles and Vacuum Arc Remelt Operational Parameters," *Metallurgical Transactions B*, vol. 17b, 1986, pp. 357–365.

*Primary Examiner*—Tu Ba Hoang
*Attorney, Agent, or Firm*—George H. Libman

[57] ABSTRACT

A method and apparatus for controlling vacuum arc remelting (VAR) furnaces by estimation of electrode gap based on a plurality of secondary estimates derived from furnace outputs. The estimation is preferably performed by Kalman filter. Adaptive gain techniques may be employed, as well as detection of process anomalies such as glows.

18 Claims, 7 Drawing Sheets

MULTIPLE INPUT ELECTRODE GAP CONTROLLER

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to methods and apparatuses for controlling vacuum arc remelting (VAR) furnaces.

2. Background Art

Vacuum arc remelting (VAR) is a process used to control the solidification of segregation sensitive alloys. A simplified schematic of the process is shown in FIG. 1. A cylindrically shaped, alloy electrode 1 is loaded into the water-cooled, copper crucible 2 of a VAR furnace, the furnace is evacuated, and a direct current (dc) electrical arc is struck between the electrode (cathode) and some start material (e.g., metal chips) at the bottom of the crucible (anode). The arc heats both the start material and the electrode tip, eventually melting both. As the electrode tip is melted away, molten metal drips off, forming an ingot 3 beneath while the electrode is consumed. Because the crucible diameter is typically 50–150 mm larger than the electrode diameter, the electrode must be translated downwards toward the anode pool to keep the mean distance between the electrode tip and pool surface constant; this mean distance is called the electrode gap ($g_e$) 4. As the cooling water 5 extracts heat from the crucible wall, the molten metal next to the wall solidifies. At some distance below the molten pool surface, the alloy becomes completely solidified, yielding a fully dense ingot. After a sufficient period of time has elapsed, a steady-state situation evolves consisting of a "bowl" of molten material situated on top of a fully solidified ingot base. As more material solidifies, the ingot grows.

The other significant parts of a typical VAR furnace shown in FIG. 1 include vacuum port 6, furnace body 7, cooling water guide 8, ram drive screw 9, and ram drive motor assembly 10.

The success of the VAR process depends on its ability to: (a) continually supply the advancing solidification region with liquid metal while minimizing the local solidification time, $t_s$; and (b) provide a stable steady-state thermal environment for the solidification process. If $t_s$ becomes too long (deep pool, relatively low longitudinal thermal gradient), alloying elements will have time to segregate near the ingot center and the probability of macrosegregation will increase. Therefore, it is necessary to carefully control pool depth in segregation sensitive alloys. However, if a stable melting environment is not achieved, neither the pool depth nor its composition will be stable, and the probability of process failure through the formation of solidification defects will be greatly enhanced.

One parameter that is crucial to the stability of the VAR process is electrode gap. If $g_e$ becomes too large, the arc will search for a less resistive path to ground, the result being intermittent arcing directly to the crucible wall. This often causes a reduction in process efficiency, but more importantly it gives rise to an unstable energy input into the ingot pool surface. If the condition persists, the electrode tip will become rounded, all of the molten metal from the electrode will drip into the center of the pool, and the pool will begin to freeze in from the sides. This constitutes a severe disruption of the process. If $g_e$ becomes too small, transient arc interruptions occur due to multiple, nearly simultaneous contacts between the electrode and ingot surfaces. This, too, leads to decreased melt rate, process instability, and severe disruption of the solidification process. However, it is not sufficient merely to control $g_e$ within the range where it is neither too small nor too large, but it must be controlled at a constant value within this range if process stability is to be achieved.

Most modern low current (<10 kA) VAR controllers use drip-short frequency ($f_{DS}$) or period ($1/f_{DS}$) to control electrode gap. Though three patents were issued in the last decade associated with various forms of drip-short control (U.S. Pat. Nos. 4,303,797, to Roberts; 4,578,795, to Fisher et al.; and 4,797,897, to Stenzel et al.), the basic phenomenon was discovered in the late 1950's and a drip-short based VAR control system was patented in 1960 by Johnson (U.S. Pat. No. 2,942,045). The basic drip-short phenomenon has been carefully investigated, see, e.g., F. J. Zanner, "Metal Transfer During Vacuum Consumable Arc Remelting," *Metallurgical Transactions B*, Vol. 10B, 1979, pp.133–42, and R. L. Williamson et al., "Voltage Signatures In VAR," *Proceedings Vacuum Metallurgy Conference*, N. Bhat, et al., eds., Iron and Steel Society, Warrendale, Pa., 1992, pp. 87–91, and may be described as follows. As molten metal drips from the electrode surface, it sometimes comes in contact with the anode pool before separating, forming a molten metal bridge between the two surfaces. This causes the melting current to momentarily flow through the bridge, giving rise to a sudden decrease in the arc voltage. The disruption usually lasts for $10^{-4}$–$10^{-3}$ seconds before the bridge ruptures and arcing resumes. There is a characteristic voltage signature associated with these "drip-shorts." The number of these events that occur per second, $f_{DS}$, is a function of $g_e$. If a sufficient number of events (circa 100) are counted to give a statistically meaningful value, $f_{DS}$ may be used as a control parameter to accurately predict and adjust electrode gap. In commercially available controllers, a drip-short frequency or period set-point is entered in and the ram drive motor 10 speed is adjusted to achieve the set-point directly. No estimate of $g_e$ is made and it is assumed that constant $f_{DS}$ implies constant electrode $g_e$.

As melting current is increased to obtain higher melt rates, $f_{DS}$ decreases concomitantly. F. J. Zanner, et al., "Relationship between Furnace Voltage Signatures and the Operational Parameters Arc Power, Arc Current, CO Pressure, and Electrode Gap during Vacuum Arc Melting of INCONEL 718," *Metallurgical Transactions B*, Vol. 17B, 1986, pp. 357–65. One reason for this involves measurement electronics: as the melting current is increased, the molten metal contact is interrupted more quickly due to increased Joule heating and the measurement electronics have to be faster to capture all of the events. More important, however, is the fact that fewer drips form at high melting currents because increased agitation of the electrode tip surface interrupts the formation mechanism. At high melting currents (>20 kA), drip-shorts are only observed at very tight electrode gaps. Hence, at medium-to-high melting current (10–40 kA), drip-short based control becomes less effective (or wholly ineffective) and arc voltage is usually used as an indicator of $g_e$. As with drip-short based VAR control systems, modern voltage-based control systems do not directly control $g_e$. The ram drive motor speed is varied to achieve a voltage set-point, not a $g_e$ set-point; constant arc voltage is assumed to ensure constant $g_e$. At low melting current, the sensitivity of arc voltage to changes in $g_e$ is not sufficient to make voltage control a viable technique. Direct voltage control has been practiced since the 1950's.

Another means of controlling electrode gap during the VAR process is to adjust electrode ram speed in response to melt rate (see U.S. Pat. No. 4,131,754, to Roberts). Obviously, as melt rate increases (decreases), the electrode gap must open (close) if ram speed is not changed. Melt rate control is usually not used by itself to control electrode gap because of: (1) lack of precision in electrode weight measurement using load cells during melting; and (2) inherent inaccuracies in the measured electrode and crucible parameters used to relate melt rate to electrode gap. This problem may be partially alleviated by long term (about 20 minutes) averaging of load cell data; however, this causes the system to be highly damped and unresponsive to process transients. To address this problem, Roberts developed a means of VAR electrode gap control wherein melt rate is used to establish the base electrode feed rate and drip-short period is used to trim the feed rate (U.S. Pat. No. 4,303,797). The patent suggests that a simple two-input electrode gap control system eliminates response problems by combining a relatively fast, accurate control signal (drip-short period) with the melt rate signal. This comprises a melt rate controller that is continually being corrected with drip-short based information. This is no improvement over straightforward drip-short based control systems. Roberts states that these, by themselves, tend to over-respond to process transients. However, this is not considered a deficiency in modern drip-short based electrode gap control systems. As will be demonstrated below, there are significant advantages to be gained by using multiple input control systems, but only if the inputs are combined in such a fashion as to yield direct and optimal estimates of electrode gap.

Other examples of methods to control VAR furnaces include: U.S. Pat. Nos. 4,775,981, to Kohnert et at.; 3,872,231, to Motter et al.; 3,385,920, to Harbaugh et al.; 3,381,079, to Murtland et al.; 3,375,318, to Kjølseth et al.; 3,364,295, to Roberts; 3,277,229, to Oppenheim; 3,187,078, to Murtland et al.; 3,186,043, to Murtland et al.; 3,143,587, to Buehl; 2,915,572, to Buehl; and 2,904,718, to Cooper et al.

The VAR process is complex and there is no known gap control method that is completely foolproof. Regardless of the method used, conditions may, and often do, arise where significant gap excursions occur while holding the controlled variable (arc voltage, drip-short frequency or melt rate) constant. Hence, effective electrode gap control requires the detection of process anomalies, or "upsets," as well as methods for their mitigation. Common examples of VAR process anomalies are "glow," electrode tip geometry changes, and melt rate excursions due to cracks and/or arc constrictions. During a glow condition, arc voltage and melt rate decrease, and drip-shorts cease. This causes a voltage-based gap estimate to be too small and a drip-short estimate to be too large, making for an unpredictable gap estimate. Transient gap excursions to changes in electrode tip geometry are often more subtle. If the electrode tip begins to round off, the dripping dynamics change and the gap must be opened to maintain a constant $f_{DS}$. Under these conditions, the mean arc voltage increases by only a relatively small amount, making for a process deviation that is difficult to detect. Melt rate excursions often cause transients in both arc voltage and $f_{DS}$, giving rise to $g_e$ excursions that may be mapped into the ingot as solidification defects. Despite the fact that these types of VAR process anomalies are common in the industry, modern VAR control systems are not designed to detect and respond to them.

Additionally, attempting to control the electrode gap by controlling the drip-short frequency or arc voltage presents problems in the area of controller tuning. In general, the arc voltage and drip-short frequency are nonlinear functions of the electrode gap. Therefore, they are related to the change in electrode gap (ram velocity) in a nonlinear fashion. In order to control the drip-short frequency or arc voltage using the ram position or velocity, a nonlinear controller is needed. However, nonlinear controllers are difficult to design and analyze, since no general theory exists. If a linear controller is used to regulate drip-short frequency and voltage, the gains of the controller will be dependent on the operating conditions.

The observations that no single means of gap control is foolproof and that different types of process anomalies affect the process variables used for gap prediction in different ways point to the advantage of making multiple independent estimates of this important process parameter and combining these estimates to form a single, statistically optimal estimate. This serves to not make the successful application of the process wholly dependent upon one variable and provides means for internal consistency checks. The current generation of VAR controllers does not provide for this important capability. In the specialty metals industry, there is a demonstrated need for a linear VAR electrode gap controller that uses multiple inputs to form optimal electrode gap estimates, that controls the parameter of interest instead of the variable used to estimate it, and that has the ability to detect and react to anomalous process behavior. The objective of this invention is to demonstrate a general, linear, VAR electrode gap control method and apparatus that uses all available information to predict and control electrode gap while detecting, logging and appropriately reacting to common process upsets.

SUMMARY OF THE INVENTION

Disclosure of the Invention

The present invention is of a method of and apparatus for controlling a vacuum arc remelting furnace comprising: sampling a plurality of outputs of the furnace; calculating a plurality of secondary estimates of electrode gap from the plurality of outputs; deriving a primary estimate of electrode gap from the secondary estimates; and adjusting an input to the furnace based on the primary estimate. In the preferred embodiment, the outputs sampled are selected from drip short frequency, drip short period, arc voltage, ram velocity, ram position, electrode melt rate, arc voltage distribution properties, melting current, electrode weight, furnace pressure, cooling water inlet and outlet temperatures, arc light emissions, and electrostatic probe data. The sampling is preferably done by taking moving averages of the outputs. The secondary estimates are preferably independent, and the primary estimate done by estimation filter, most preferably by Kalman filter. Adaptive gain input may be provided to the estimation filter to weight the secondary estimates differently in response to changes in state of the furnace. A desired result of the system design is that the input to the furnace bear a linear relationship to the primary estimate. The system preferably detects furnace process anomalies and adjusts inputs to the furnace upon detection of an anomaly. The invention can handle anomalies as diverse as glows, electrode tip geometry changes, melt rate excursions, melting transients, furnace start up, and hot topping (the latter two being anomalies only in the sense that they occur only for short durations during a melt).

A primary object of the present invention is to control VAR furnaces based on accurate estimations of electrode gap.

Another object of the present invention is to simultaneously detect various anomalies that may occur during the VAR process and react accordingly.

A primary advantage of the present invention is that electrode gap is estimated from a wide range of available control information, rather than relying on use of secondary control variables such as drip short frequency.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes For Carrying Out the Invention

Figure 1:
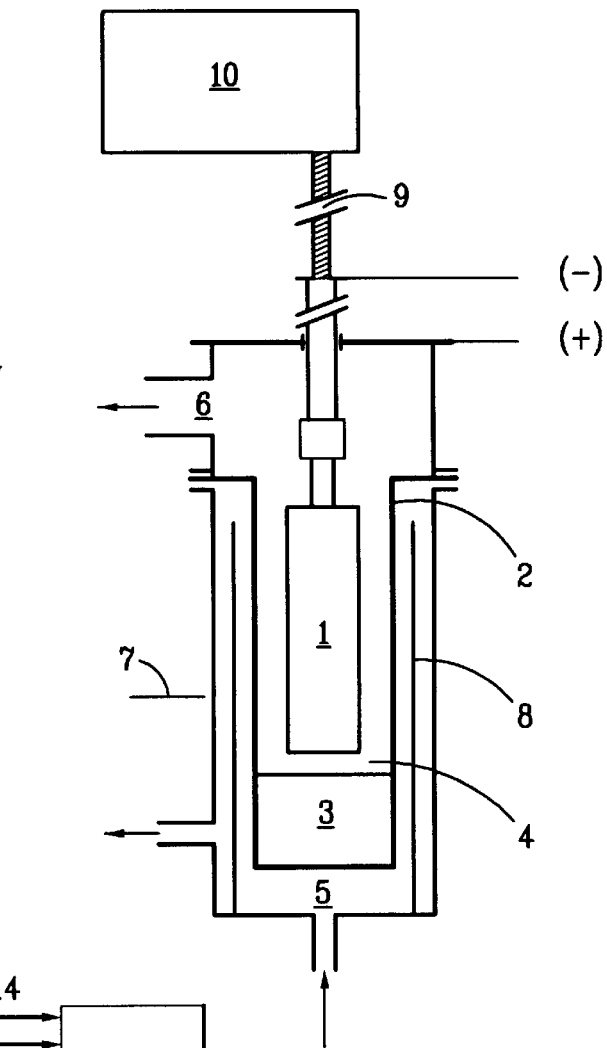
FIG. 1 is a cut-away schematic of a typical VAR furnace (prior art)
Figure 2:
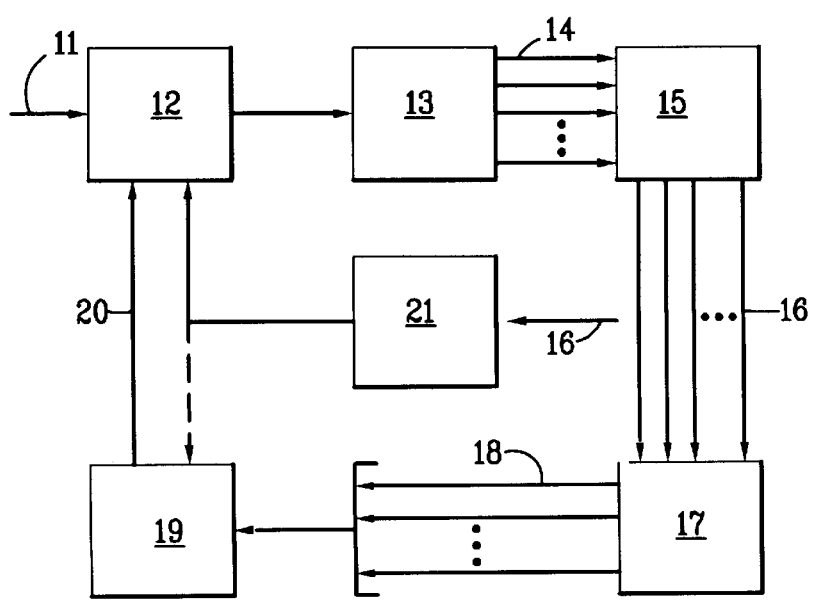
FIG. 2 is a schematic of the preferred VAR controller of the present invention.

The present invention is of a method and apparatus for controlling VAR furnaces by estimating electrode gap and detecting process anomalies. The preferred controller of the invention is depicted in FIG. 2. A $g_e$ reference or set-point 11 is input into process controller 12. The process controller may be any of several types. A standard proportional-integral-differential (PID) controller may be used, modified to react appropriately to the process anomaly detector 21 output. The controller output is fed to the VAR furnace 13. Typically, this output is in the form of a voltage signal that controls the electrode ram velocity. Several furnace outputs 14 are fed into signal measurement box 15. Frequently, measured furnace outputs are arc voltage distribution properties (such as skewness), melting current, electrode ram position and speed, electrode weight, furnace pressure, cooling water inlet and outlet temperatures, and drip-short frequency. Other outputs, such as arc light emissions and electrostatic probe data, are less commonly measured, but available when needed. The measured data are used as inputs 16 for both system models 17 and process anomaly detector 21. The system models consist of experimentally determined models with known error characteristics which map the furnace outputs to independent estimates of electrode gap 18. By using system models to form electrode gap estimates, the control system is linearized. It should be understood that these estimates are independent with respect to time as well as method. Thus, they arrive at the optimal electrode gap estimator 19 at different times and with independent frequencies. The estimates vary in accuracy and precision as determined through experiment, and are input into the optimal estimator where they are weighted appropriately to determine the optimal gap estimate 20. The optimal gap estimate is fed to controller 12 where it is compared to the set point 11 and an error signal is formed. This error signal is used to determine the control action to the furnace. In addition, the output of the process anomaly (or upset) detector 21 is fed into the controller where it is used to modify the controller response as needed to control the process through periods of anomalous process behavior. The upset detector output may also be input into the optimal estimator where the information would be used to modify the input weights.

Before going into detail about the estimator and controller design, an overview of the entire process control system is useful to permit placement of the various components of the system in perspective. FIG. 2 details the layout of the preferred electrode gap controller. As can be seen from FIG. 2, the controller can be divided into three stages. These stages consist of a linearization stage, which converts the drip short frequency and arc voltage measurements (and/or other furnace outputs) into gap estimates; an estimation stage, which combines the gap estimates provided by the linearization stage into a single estimate of gap; and a control stage, which compares the gap estimate provided by the estimation stage with the gap set point and adjusts the control input (e.g., ram velocity) to maintain this set point.

The function of the linearization stage is to form estimates of the electrode gap based on, for example, drip short frequency and voltage measurements. The linearization stage also allows for the use of a linear algorithm in the control of the gap. Drip short frequency, for example, is a nonlinear function of electrode gap. One could design a controller which attempted to maintain a constant gap by maintaining a drip short frequency set point. However, if a linear controller was designed that attempted to hold the gap constant by controlling drip short frequency, the gains used in the controller would need to change depending on the drip short frequency set point. This is because the relationship between the drip short frequency and the control input (ram velocity) is nonlinear. The drip short frequency function would need to be linearized about a particular set point, with the controller gains being dependent on the set point. If, however, the drip short frequency function is inverted so that gap is estimated directly, the relationship between the estimated gap and the control input is linear, and the controller gains do not need to be adjusted for different set points. This is the approach taken by the present invention.

To help filter some of the high frequency noise that is present on the drip short frequency and voltage signals, a moving average (of, e.g., a twenty second duration) of the measurements is supplied to the linearization stage. All of the models used to obtain estimates of the gap from the measurements were developed using average values of the signals. While a 20 second moving average is used as a filter in this instance, other types of filters might provide better performance and/or simplify the analysis.

The estimation stage uses as inputs the independent estimates of gap provided by the linearization stage. The output of the estimation stage is a single estimate of the electrode gap. A Kalman filter is preferred to combine the estimates of gap provided by the linearization stage into an 'ideal' estimate of gap. See R. G. Brown et al., *Introduction to Random Signals and Applied Kalman Filtering*, 2d ed., New York, John Wiley & Sons, 1992. Other estimators known in the art may work acceptably. The estimates are combined by weighting each estimate according to that estimate's relative uncertainty. In this way, the estimate with the least amount of uncertainty will be assigned the largest weight. The estimate provided by the estimation stage will ordinarily have an uncertainty that is less than the uncertainties of any of the estimates provided by the linearization stage.

The function of the control stage is to compare the gap estimate provided by the estimation stage with the gap set point and adjust the control input to the furnace so that the error between the two approaches zero. The control input is either the velocity or position of the electrode ram. For this system, a standard proportional control law system may be used, with the gains being chosen primarily through trial and error.

In order to control the electrode gap, one must either measure the gap directly or infer the gap from some other signal. For all practical purposes, direct measurement of the electrode gap in a VAR furnace is impossible without seriously interrupting the process. Therefore, in order to design a VAR gap controller, a device must be constructed that provides an accurate estimate of the electrode gap based on the signals available for measurement.

This section discusses the design of a Kalman filter that allows for the estimation of the electrode gap based on the arc voltage and the drip short frequency as exemplary inputs into a system according to the present invention. The form of the gap controller is also discussed.

A Kalman filter or estimator is a device that provides an estimate of some variable based on a set of noisy measurements. The filter accounts for the noise in the measurement signals and provides an estimate of the variable which minimizes the mean square error between the true value of the variable and the estimate.

Consider the goal of determining the value of the electrode gap in an unobtrusive manner. Assume for the moment that two independent estimates of the electrode gap are available, labeled $y_1$ and $y_2$. These estimates might be formed by using the voltage and drip short frequency. Each of these estimates has associated with it some amount of error, and these errors are randomly distributed about zero with variance of $\sigma_1^2$ and $\sigma_2^2$, respectively. These errors represent the uncertainty of each of the gap estimates.

Figure 5:
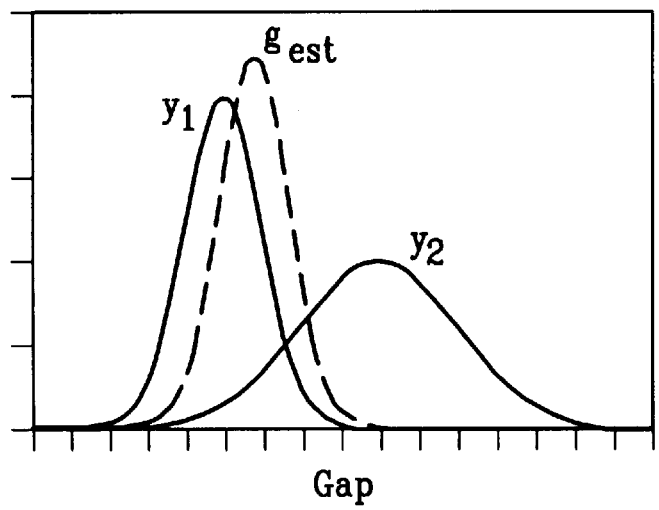
FIG. 5 illustrates the estimation of electrode gap by combining two independent gap estimates.

FIG. 5 presents the measurement scheme graphically. The two estimates of gap are represented as realizations of a random process with a frequency distribution shown by the solid curves. The variance of the estimates is equal to the variance of the frequency distributions. The actual gap is within the area of intersection of the errors of each of the independent gap estimates. The estimate of gap formed by considering both of the independent gap estimates is represented as $g_{est}$ and has a frequency distribution corresponding to the dashed line. The variance of the dashed frequency distribution is equal to the variance of $g_{est}$.

One can show that if the independent estimates are combined in a linear manner, $$g_{est} = K_1 y_1 + K_2 y_2 \text{ where}$$

$$K_1 = \frac{\sigma_2^2}{\sigma_1^2 + \sigma_2^2} \text{ and } K_2 = \frac{\sigma_1^2}{\sigma_1^2 + \sigma_2^2}.$$

Provided that the errors of the two independent measurements are white zero mean processes, the estimate is the best linear estimate possible. The resulting uncertainty in the estimate obtained from the linear combination of the independent estimates is given by, $$\sigma_{est}^2 = \frac{\sigma_1^2 \sigma_2^2}{\sigma_1^2 + \sigma_2^2},$$

where $\sigma_{est}^2$ is less than either $\sigma_1^2$ or $\sigma_2^2$. Thus, the combined estimate has less uncertainty than either of the individual independent estimates.

A Kalman estimator is just an extension of the above concept. The Kalman filter continuously processes estimates of the electrode gap obtained from the drip short frequency and voltage signals and combines these estimates into one gap estimate. The independent estimate with the least amount of uncertainty receives the greatest weight in the formation of the estimate.

The present VAR control method and apparatus has substantial advantages relative to existing controllers as follows: The present invention uses system models to make multiple, independent estimates of electrode gap of known accuracy. Hence, it is a true electrode gap controller and not a voltage or $f_{DS}$ controller. Because the controller is model based, the feedback signal is linearized, allowing for the use of linear controllers. For example, an embodiment of the invention using arc voltage, melting current, ram speed, and drip-short data to calculate two independent $g_e$ values, has the advantage of building redundancy into the system so that no single variable is wholly relied upon for a gap estimate. The system models are developed using experimental data and are specific for the material and furnace employed. Therefore, the accuracy of the various models and their range of application are well characterized.

The present invention also uses well understood optimal estimator (e.g., Kalman filter) techniques to combine the various electrode gap estimates and form the statistically optimal estimate. This incorporates all relevant information into the control decision, taking advantage of the redundant estimates discussed above, and allows for new estimate inputs as these become available. Hence, this invention constitutes an inherently more robust means of electrode gap control.

The present invention further allows for adaptive gains to be used in the optimal estimator (e.g., Kalman filter) which has the advantage of allowing estimator inputs to be weighted differently in response to changes in the state of the process. For example, as melting current increases, the controller may de-emphasize drip-short based input in favor of input based on arc voltage. Thus, this invention constitutes an more versatile means of VAR electrode gap control.

The present invention additionally incorporates process upset detection, the output of which can be used as input to the process controller and/or the optimal estimator. In the former case, the input may be used to modify control decisions. For example, the system may be set up to detect the glow condition. Glows often last for 10–20 seconds. When the anomaly detector senses a glow condition, the controller may be set to halt the ram drive until normal melting resumes. This response enhances the ability of the controller to maintain stable electrode position relative to the ingot pool surface. The incorporation of upset detection and mitigation into the general control scheme makes this invention a more intelligent method of VAR process control.

There are many areas of investigation that might improve the performance of the gap controller. These areas include the dynamics of the melting electrode, incorporation of additional measurement signals, and advanced control and adaptation techniques.

Additional controller selections are possible. The proportional algorithm preferred in the control stage of the electrode gap process controller is due to its familiarity and simplicity. The addition of a dynamic model describing the behavior of the melting electrode may improve performance of the electrode gap estimator. Such a model might include the effects of melting and ram velocity on the electrode gap. This model could then be incorporated into the Kalman filter equations.

Measurement models developed from factor space experiments represent the steady state behavior of the process. However, the gap is changing continuously and the drip short frequency and voltage (and other furnace outputs) might display a transient behavior. Work to characterize the transient response of the drip short frequency and voltage with changing electrode gap may be usefully applied to the present invention. The statistics describing the behavior of the drip short frequency, etc., will then be dynamic in nature and could then dynamically influence the weighting of the gap estimate provided by the drip short frequency, etc.

The framework of the Kalman filter does not place a restriction on the number of measurements that may be incorporated into the filter equations. The addition of other independent estimates of gap can improve the robustness and accuracy of the estimator. Melt rate is one measurement that may usefully provide an estimate of the electrode gap to be incorporated into the filter. The noise (uncertainty) on the gap estimate may be calculated and a weight for the estimate determined. Melt rate has the advantage of not being susceptible to electrical transients and noise that presently affect the voltage and drip short frequency measurements.

Adaptation mechanisms may also be incorporated into the electrode gap controller. The weights used by the Kalman filter to form the gap estimate might be made to depend on the size of the electrode gap as well as the melting current. Because this information might be difficult to quantify, a fuzzy logic controller that incorporates a rule base describing the relative weight based on the gap estimate would be well suited to this application. For "large" values of gap at "high currents", less weight could be placed on the gap estimate provided by the drip short frequency. A similar adaptation mechanism to dampen the response of the controller at "small" values of gap is possible.

The preferred process controller performs best under steady state melting conditions. While modifications may be straightforwardly made to improve control during glows, as discussed in the example, melting upsets in general may be handled according to the present invention. The form of a comprehensive VAR controller might be as follows. A layer of supervisory control would monitor all of the necessary melting variables and determine what mode of operation the furnace was in. This system would include methods of identifying various melting disturbances. The supervisory controller would then choose one of several control methods depending on the mode of operation. These control methods would include methods of correcting from melting transients, controlling during steady state, and controlling during start up and hot top.

Industrial Applicability

The invention is further illustrated by the following non-limiting examples.

EXAMPLE 1

An embodiment of the VAR electrode gap control method and apparatus of the invention was constructed and successfully tested during VAR of 17 inch diameter stainless steel into 20 inch diameter ingot in an atmosphere of 0.5 Torr nitrogen; melting current was varied from 8 to 17 kA during the trials in an industrial VAR furnace. The gap estimator formed an estimate of the electrode gap from two separate, independent estimates of gap. One of the independent gap estimates was determined from the arc voltage and the other was determined from the drip-short frequency. The arc voltage and drip-short frequency were related to the electrode gap and melting current by experimentally determined process models. The electrode gap estimate used to control the electrode ram was formed as a weighted sum of the independent gap estimates obtained from the drip-short frequency and arc voltage measurements. The relative error of the process models was used as the weights on the independent gap measurements.

An error signal was formed by comparing the estimate of the electrode gap to an electrode gap set point. This error signal was used by a proportional controller to form a ram velocity signal, which was subsequently integrated to determine the desired position of the ram at that instant. The desired ram position was fed to another proportional controller which compared the position reference with a ram position feedback signal. Based on the error between the two, a hydraulic servo valve was adjusted to control the position of the electrode ram.

Figure 3:
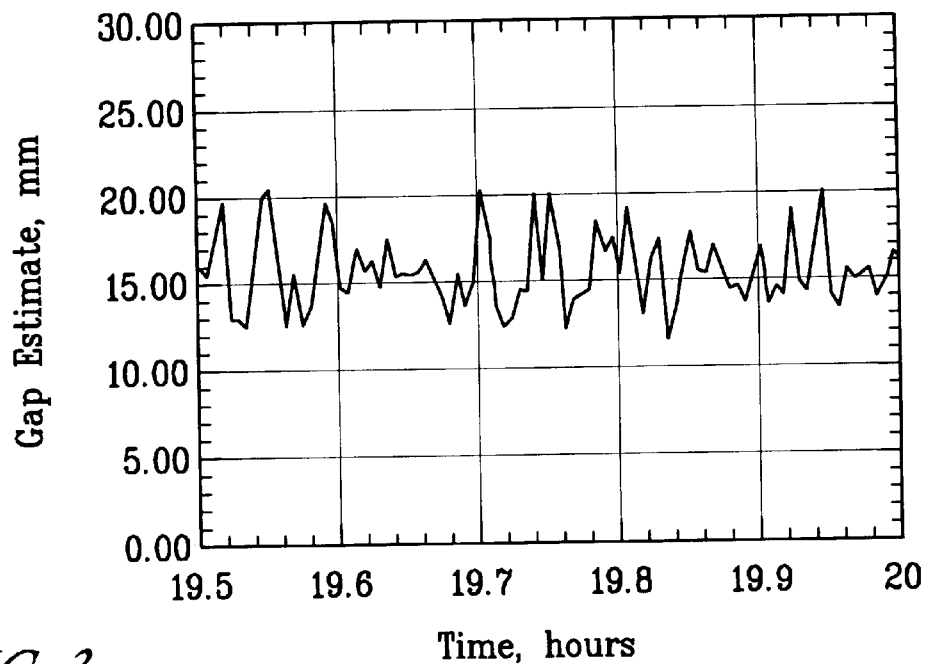
FIG. 3 is an exemplary graph of electrode gap estimates formed from independent estimates based on arc voltage and drip short frequency according to the invention.

FIG. 3 shows the gap estimate as a function of time for a thirty minute segment of data. Most of the variation in the gap estimate can be attributed to variations in the voltage and drip-short frequency signals. Variations in the voltage and drip-short frequency were translated into variations in the independent gap estimates provided by each of the signals. These variations were in turn mapped into the combined gap estimate. Various filtering techniques can be used to reduce the variation in the gap estimate. In addition, modifications can be made to the estimation algorithm that will reduce the sensitivity of the estimate to random noise.

Figure 4:
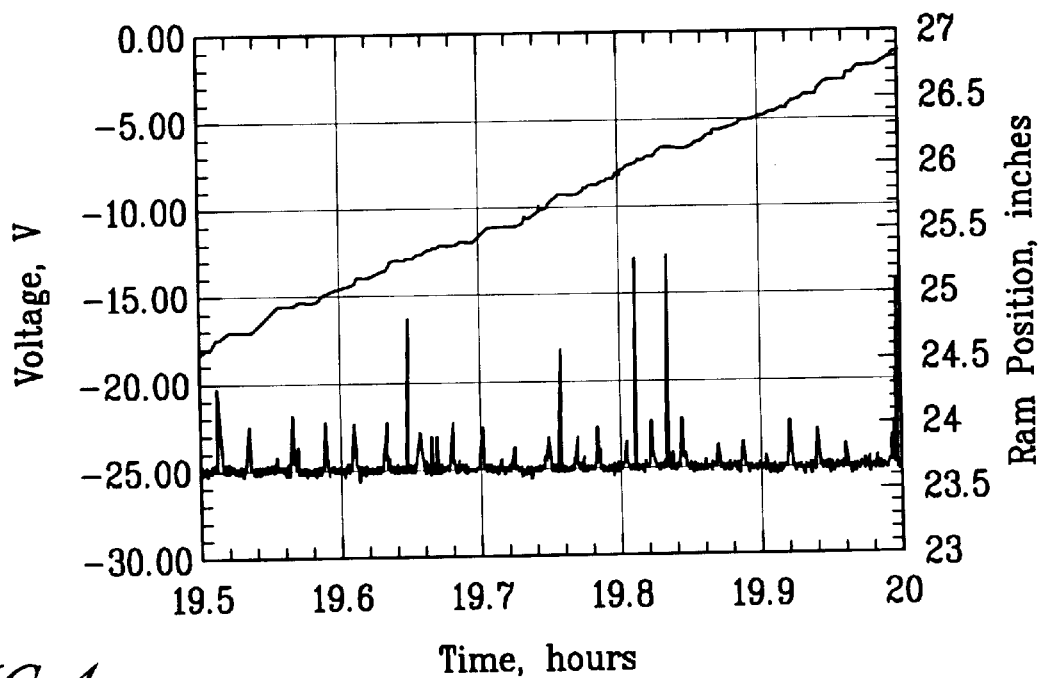
FIG. 4 is an exemplary graph of voltage (bottom) and ram position (top) during the time period of the graph of FIG. 3.

FIG. 4 shows the arc voltage and the ram position for a thirty minute section of data during the industrial experiment. The large positive going spikes on the voltage signal are the result of the furnace going in and out of glows. Note that the glows did not adversely affect the response of the furnace. Logic was built into the controller program to freeze the ram position during glows when the process models are not valid and when melting virtually halts. Also, during this melt significant drip-short frequency anomalies were detected. Logic was included in the controller to maintain constant electrode feed rate during these periods.

In order to obtain estimates of the electrode gap based on the arc voltage and drip short frequency signals, measurement models were developed. These models relate the drip short frequency and arc voltage to the melting current and electrode gap. To develop the measurement models, a factor space experiment was performed on an industrial VAR furnace. The data obtained during this experiment were then used to relate the arc voltage and drip short frequency to the melting current and gap. The goal was to allow for the prediction of gap based on the voltage and drip short frequency with a prediction error which was randomly distributed about the true value.

The factor space experiment involved melting a 12-Cr steel electrode in a Consarc VAR furnace. The diameter of the electrode varied from 17.9 inches at one end to 16.9 inches at the opposite end. The ingot was solidified in a water cooled copper crucible. Helium was used as the ingot cooling gas and the head space of the furnace was pressurized with Argon gas. The independent variables of the factor space were the melting current, electrode gap, and ambient furnace pressure. Experimental trials were performed at different values of current, gap and pressure. The current ranged from approximately 8.5 kA to 16.9 kA. The furnace pressure ranged from 530 mTorr to 970 mTorr. The electrode gap was varied from approximately 3 mm to 18 mm.

Two experimental trials were attempted at each point in the factor space, each consisting of approximately five to ten minutes of data. During each experimental trial, the electrode was driven down at a constant velocity that seemed to match the rate of melting at that particular current. In this way an attempt was made to hold the gap constant during the trial. A total of 38 experimental trials were performed.

Several measurements concerning the state of the furnace were made continuously and recorded to magnetic tape using a Metrum RSR 512 data recorder. In addition to arc voltage, melting current, and furnace pressure, the ram position, glow probe voltage, PMT signal (which measured arc light intensity), cooling water inlet and outlet temperature, and cooling water flow rate were recorded.

The arc voltage was measured across the ram and the furnace body, with the ram being referenced positive to ground. The melting current was measured as it passed through the furnace ram using a Halmar 17ADM current transducer. Both current and voltage were digitized at a rate of 40 kHz. The furnace pressure was measured using a vacuum pressure gauge mounted through a flange approximately 12 inches above the gate valve on the furnace body. The pressure signal was digitized at a rate of 5 kHz.

During the experiment, the arc voltage was also monitored by a personal computer using a National Instruments MIO 16-5F data acquisition board. The number of drip shorts per second was determined from the voltage signal and written to a data file along with various statistics of the arc voltage and drip short frequency.

The electrode gap was determined at the beginning and end of each experimental trial by driving the electrode towards the molten pool until the arc was shorted for a significant period of time (about 1 second). The distance traveled by the ram to obtain a short of the arc was taken to be the electrode gap. If the gap did not change significantly from the beginning to the end of the experimental trial, the data during the entire trial were used. If the gap changed by more than ten percent over the course of the trial, the three minutes of data just prior to the gap check were used as an experimental trial.

For analysis purposes, the arc voltage, melting current and furnace pressure were digitized from magnetic tape at a rate of 177 Hz using a personal computer. From these data, one second averages for each of the signals were computed and written to a data file. The data for each experimental trial were extracted and the average values of the arc voltage, melting current, furnace pressure and drip short frequency over the trial were computed. The measurement models were then developed around these values.

Due to the relatively high ambient furnace pressure at which the experiment was conducted, the arc would frequently switch in and out of a glow condition. The glows were not severe, and usually lasted less than one minute. However, the glows did influence the average arc voltage during the experimental trials. Typically, during a glow, a drop in potential would be associated with a corresponding rise in furnace pressure. In order to obtain an average arc voltage that more accurately reflected the electrode gap, a program was written to exclude the arc voltage data when the furnace was in a period of glow. These adjusted voltages were then used to compute the average voltage over the trial.

The average values for each of the process variables are presented in Table 1. This table includes the average values of the melting current, furnace pressure, arc voltage, drip short frequency, and electrode gap. The data contained in Table 1 were used to develop models describing the measurements.

One could develop many different models describing the relationship between the process variables. However, most of these models would not be physically justifiable. Therefore, two model forms were chosen. These forms are, $$f_{DS}=C_1 I^a g^b$$

$$V=D_1 I g + D_2 I^2 + D_3.$$

In the above equations, $f_{DS}$ is the drip short frequency in counts per second (Hz), V is the arc voltage in volts, I is the melting current in kiloamps, and g is the electrode gap in millimeters. $C_1$, $D_1$, $D_2$, $D_3$, a and b are all constants to be determined by the regression. The voltage model was derived using a linear regression routine and the drip short frequency model using a nonlinear routine.

TABLE 1

| Melting Current (kA) | Pressure (mTorr) | Voltage (V) | Drip Short Freq (Hz) | Gap (mm) |
| --- | --- | --- | --- | --- |
| 8.55 | 640.3 | −23.3 | 15.9 | 3.4 |
| 8.56 | 647.7 | −23.1 | 10.8 | 5.8 |
| 8.54 | 647.4 | −23.1 | 13.2 | 5.8 |
| 8.54 | 644.6 | −23.3 | 14.7 | 5.6 |
| 8.59 | 644.6 | −23.8 | 2.8 | 6.1 |
| 8.58 | 643.0 | −24.0 | 4.6 | 7.7 |
| 8.60 | 643.1 | −23.9 | 3.7 | 7.9 |
| 8.56 | 648.2 | −23.9 | 1.5 | 16.1 |
| 8.53 | 642.9 | −24.1 | 2.0 | 18.6 |
| 8.51 | 641.1 | −24.2 | 2.1 | 19.0 |
| 13.05 | 657.8 | −24.3 | 6.0 | 7.9 |
| 13.15 | 657.1 | −24.0 | 6.9 | 5.8 |
| 13.24 | 655.6 | −23.7 | 8.9 | 5.9 |
| 13.20 | 651.8 | −24.7 | 1.6 | 9.7 |

TABLE 1-continued

| Melting Current (kA) | Pressure (mTorr) | Voltage (V) | Drip Short Freq (Hz) | Gap (mm) |
|---|---|---|---|---|
| 13.22 | 652.3 | −24.6 | 2.1 | 7.8 |
| 13.17 | 654.1 | −24.6 | 1.8 | 9.5 |
| 16.88 | 654.9 | −24.6 | 4.2 | 6.1 |
| 16.88 | 656.3 | −24.9 | 2.8 | 6.9 |
| 16.84 | 657.2 | −24.5 | 5.2 | 7.6 |
| 16.82 | 654.2 | −25.3 | 0.7 | 11.8 |
| 16.80 | 653.2 | −25.4 | 0.6 | 11.8 |
| 16.77 | 966.4 | −24.7 | 3.3 | 6.9 |
| 16.75 | 990.7 | −24.7 | 3.4 | 8.7 |
| 16.76 | 984.5 | −24.8 | 2.7 | Unknown |
| 12.90 | 979.8 | −24.5 | 3.0 | 7.7 |
| 12.90 | 980.9 | −24.4 | 3.6 | 7.7 |
| 12.91 | 978.9 | −24.3 | 4.4 | 7.0 |
| 12.89 | 976.3 | −25.0 | 0.5 | 13.6 |
| 12.89 | 978.0 | −25.0 | 0.5 | 13.5 |
| 12.89 | 978.0 | −25.0 | 0.5 | 17.1 |
| 12.90 | 533.4 | −24.8 | 0.5 | 17.6 |
| 12.90 | 537.5 | −24.7 | 0.7 | 16.5 |
| 12.89 | 545.7 | −23.3 | 7.1 | 3.2 |
| 12.89 | 543.9 | −23.7 | 6.5 | 5.6 |
| 12.49 | 534.8 | −23.1 | 7.7 | 5.7 |
| 15.10 | 529.4 | −24.9 | 0.8 | 9.9 |
| 15.08 | 537.3 | −25.1 | 0.5 | 14.6 |
| 15.09 | 537.9 | −24.2 | 4.7 | 8.4 |

Models describing the relationship between drip short frequency or voltage and gap are not unique, and a number of different forms can provide similar results. However, there are several reasons to use the forms described by Eq. 4. The nonlinear form of the drip short frequency model has previously been used to describe the behavior of drip short frequency with gap and has provided good results in the past. As to the form of the voltage model, some physical interpretation can be applied. The Ig term in Eq. 4 represents an Ohm's law type dependency between the gap, current and voltage. The gap acts as a resistance to current flow, and that resistance can be modeled as being linearly related to the gap. The constant term could account for the cathode and anode fall associated with an arc burning between two electrodes. The nonlinear term in current might account for some current dependence in the cathode and anode drop.

After fitting the models to the data, the following relationships were obtained:

$$f_{DS} = 1025 I^{-1.25} g^{-1.17} \pm 2.1$$

$$V = -0.007 I g - 0.003 I^2 - 22.975 \pm 0.25.$$

Figure 6:
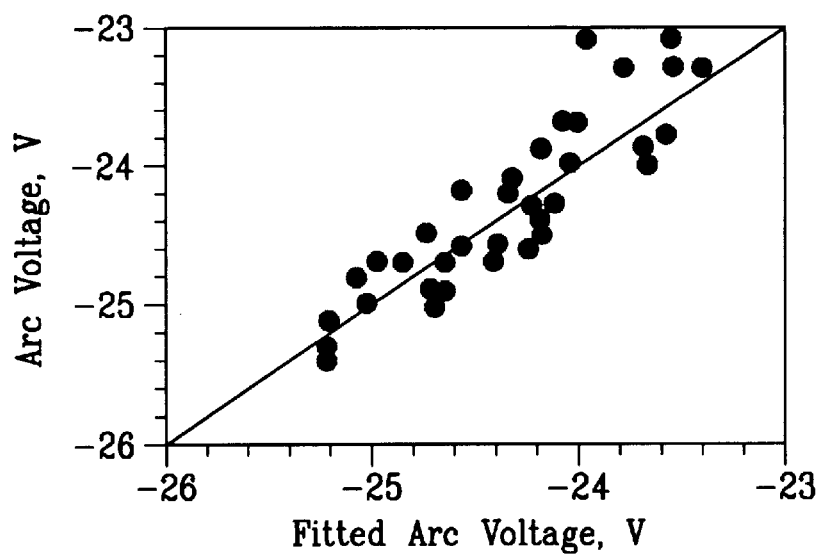
FIG. 6 is an exemplary plot of arc voltage versus fitted arc voltage.
Figure 7:
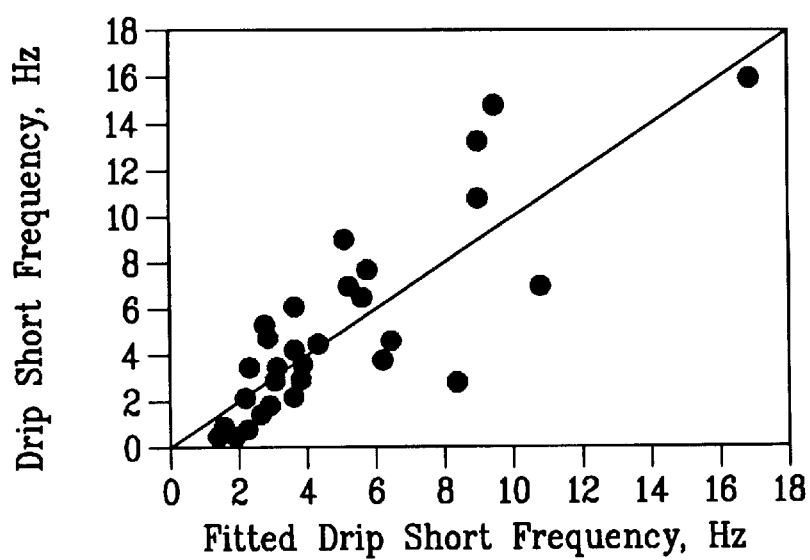
FIG. 7 is an exemplary plot of drip short frequency versus fitted drip short frequency.
Figure 8:
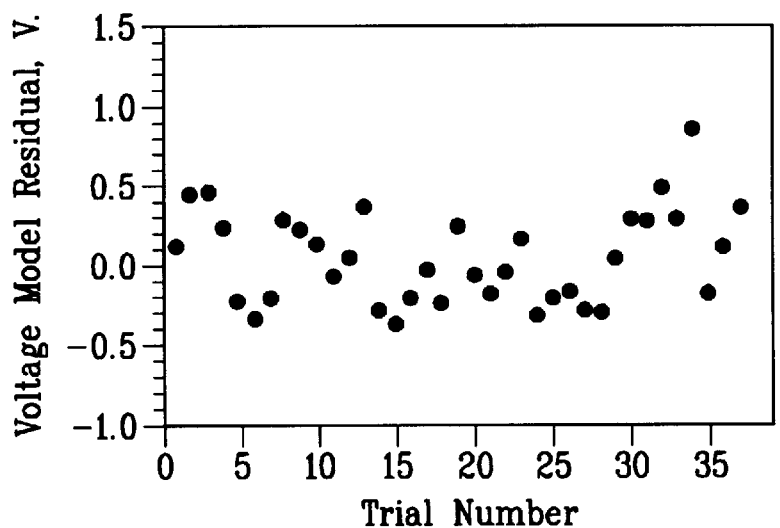
FIG. 8 is a plot of voltage model residuals versus experimental trial.
Figure 9:
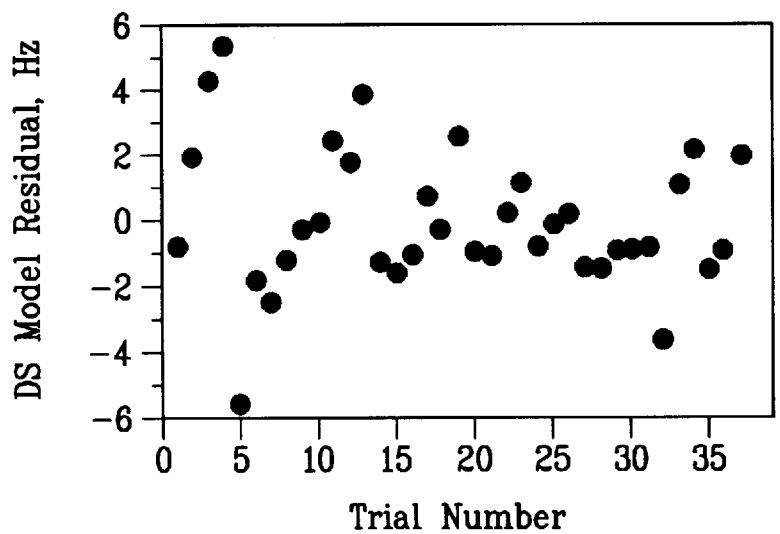
FIG. 9 is a plot of drip short model residuals versus experimental trial.

FIGS. 6 and 7 show the experimental data versus the fitted values of the regression for the voltage and drip short frequency models, respectively. Plots of the residuals for each of the models are shown in FIGS. 8 and 9. One can see from the plots that the model residuals do not appear to be correlated in time.

Because gap is the variable that is being controlled, the gap needs to be estimated from the measurement models. In order to accomplish this task, the measurement models are inverted and solved for electrode gap in terms of drip short frequency or voltage and current. From the drip short frequency model, the gap may be predicted by, $$\hat{g} = \left( \frac{f_{DS}}{1025 I^{-1.25}} \right)^{-0.85}$$

In the above equation, ĝ represents the predicted gap in millimeters. Using the voltage model, the gap is given by, $$\hat{g} = \frac{V + 0.003 I^2 + 22.975}{-0.007 I}$$

There is one problem associated with inverting the measurement models to obtain an estimate of the electrode gap. After inverting the models, the residuals describing the error between the actual value of gap and the predicted value of gap are no longer distributed as a Gaussian distribution with zero mean. The skewing of the residuals is especially noticeable for the gap predicted by the drip short frequency model.

The reasoning behind the skewing of the residuals is logical when considered from the point of view of the regression. The regression attempts to minimize the mean square error between the fit and the experimental data. When the regression is inverted to predict gap, the regression that minimizes the error with respect to the voltage or drip short frequency does not necessarily minimize the error with respect to the gap. This effect is especially noticeable when considering nonlinear regressions.

In order to develop an unbiased estimator of the electrode gap, the error associated with the prediction of gap should be normally distributed with zero mean. To ensure that the models developed satisfy this requirement, new models of the form, $$\hat{g}_1 = C_2 I^c f_{DS}^d$$

$$\hat{g}_2 = D_4 \frac{V}{I} + D_5 I + \frac{D_6}{I}$$

were used. In the new models, $\hat{g}_1$ and $\hat{g}_2$ represent the predicted gap based on the drip short frequency and voltage measurements, respectively. The forms used in Eq. 8 were obtained by solving the equations in Eq. 4 for gap. After performing the regression using the new models, new gap prediction models were obtained:

$$\hat{g}_1 = 149 I^{-0.97} f_{DS}^{-0.42} \pm 2.5$$

$$\hat{g}_2 = -101.2 \frac{V}{I} - 0.25 I - \frac{2304.5}{I} \pm 2.6$$

Figure 10:
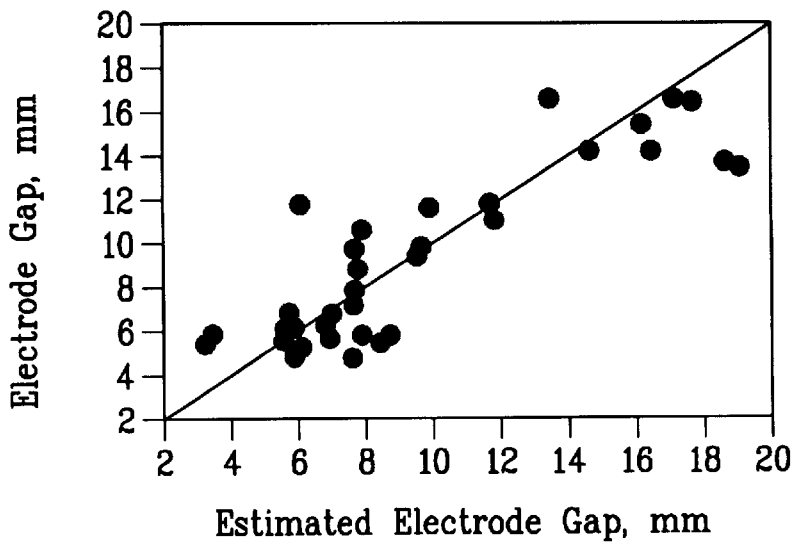
FIG. 10 is an exemplary plot of electrode gap versus gap estimated from drip short frequency measurement.
Figure 11:
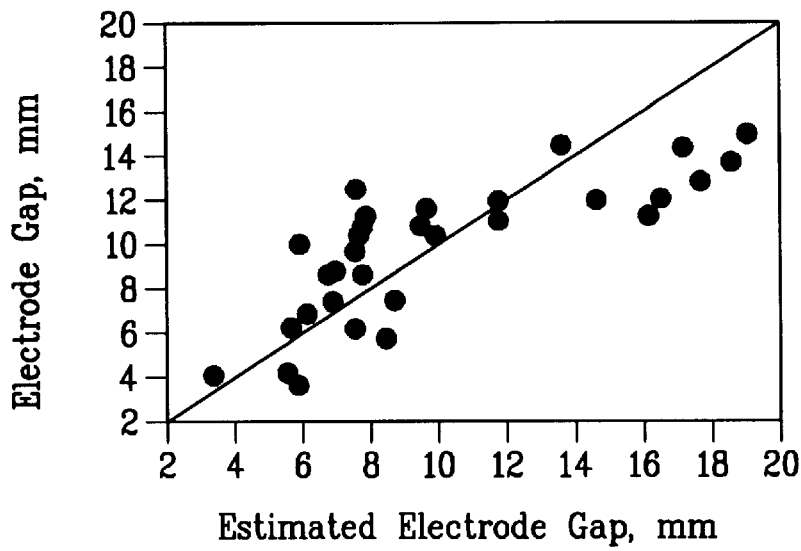
FIG. 11 is an exemplary plot of electrode gap versus gap estimated from voltage measurements.
Figure 12:
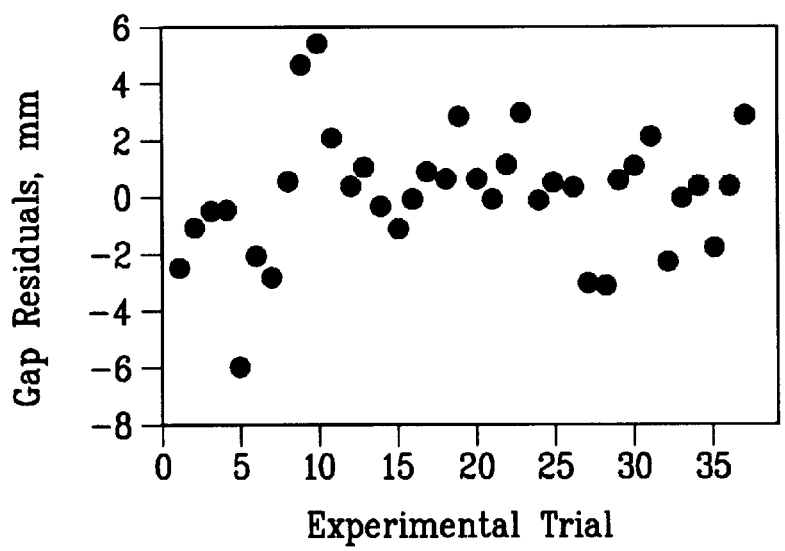
FIG. 12 is a plot of gap residuals versus experimental trial using drip short measurement.
Figure 13:
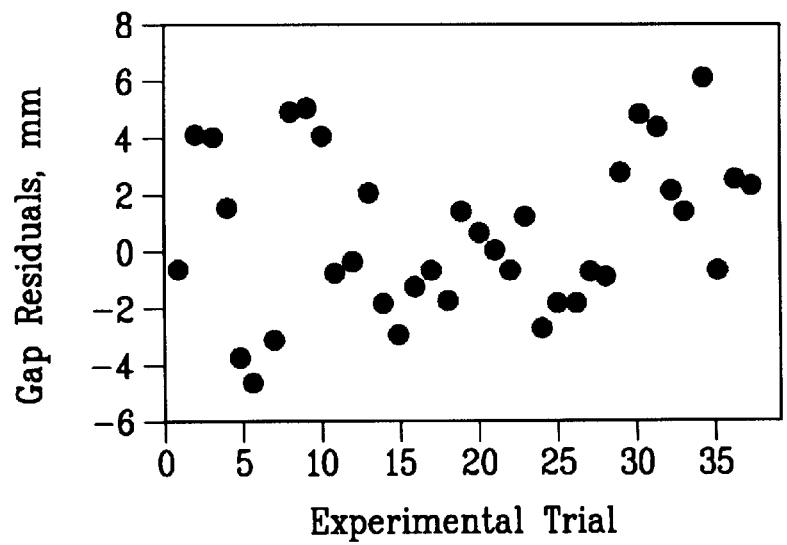
FIG. 13 is a plot of gap residuals versus experimental trial using voltage measurement.

The residuals associated with Eq. 9 are normally distributed with zero mean, as expected. FIGS. 10 and 11 show plots of the electrode gap versus the estimated gap using voltage and drip short frequency, respectively. FIGS. 12 and 13 show the residuals versus the experimental trials for the gap estimates provided by the voltage and drip short frequency, respectively.

Before the Kalman filter equations can be implemented, the noise associated with the measurement model must be characterized. In this particular case, the measurement noise can be viewed as the error associated with the measurement model regression. The noise represents the uncertainty in the measurement.

Typically, melting in VAR furnaces is carried out at a constant melting current. With respect to the measurement models, that leaves the gap, voltage and drip short frequency as variables. One might postulate that the error associated with the regression varies as a function of melting current. Therefore, the measurement model error, or measurement noise, is characterized as a function of melting current.

Figure 14:
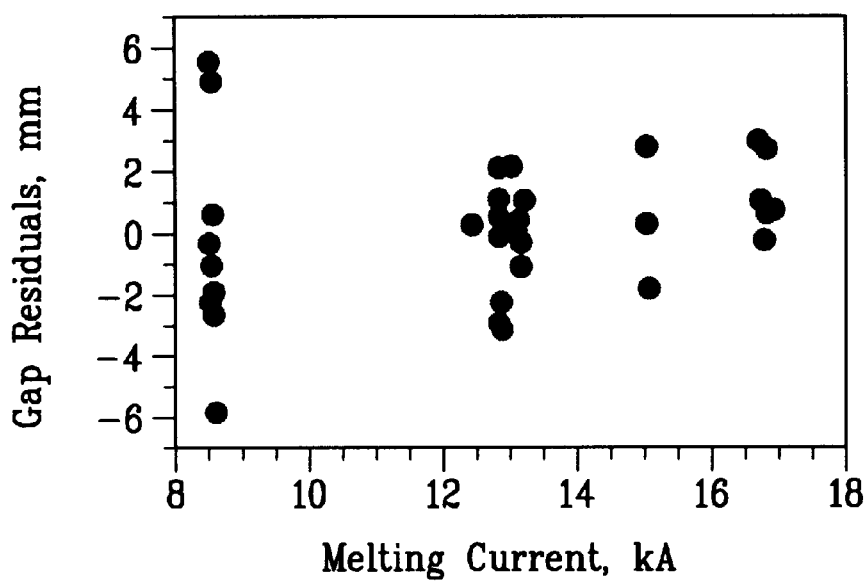
FIG. 14 is a plot of gap residuals versus melting current for the drip short frequency model.
Figure 15:
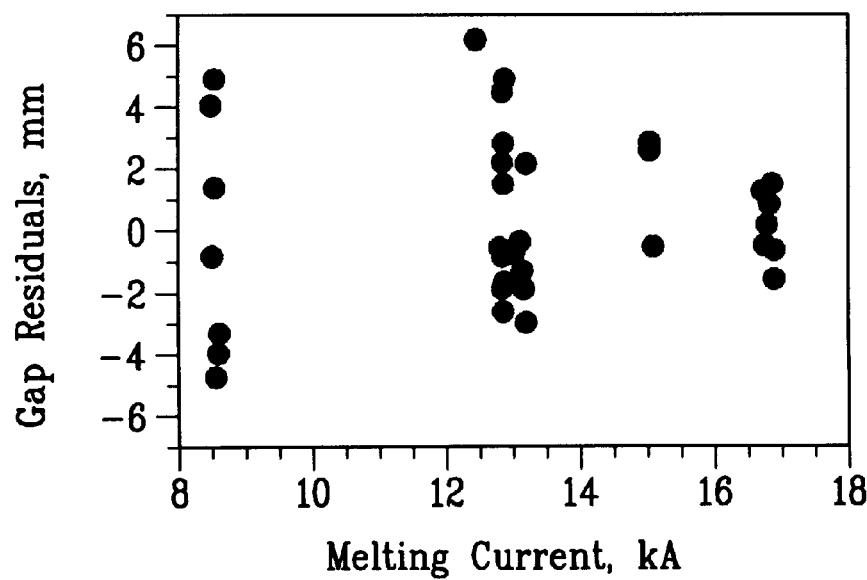
FIG. 15 is a plot of gap residuals versus melting current for the voltage model.

FIGS. 14 and 15 show the residuals of the gap estimation models of Eq. 9 as a function of melting current for the drip short frequency and voltage forms, respectively. The scatter of the model residuals appears to decrease as melting current increases, indicating that less error exists in the gap estimate at higher currents.

The Kalman filter equations call for the specification of the covariance matrix R, which represents the measurement model error (noise). This is simply the covariance of the measurement model residuals at the various current levels. These covariance values are summarized below in Table 2 and comprise the elements of the covariance matrix R in the filter equations.

| Melting Current (kA) | Variance of Voltage Model Residuals | Variance of Drip Short Model Residuals | Covariance between Voltage and Drip Short Residuals |
|---|---|---|---|
| 8.5 | 12.6 | 11.5 | 10.5 |
| 13.0 | 6.5 | 2.4 | 1.3 |
| 15.0 | 3.4 | 5.2 | 4.8 |
| 17.0 | 1.2 | 1.2 | 0.8 |

As mentioned above, the function of the gap controller is to form the error between the electrode gap set point and the estimate of the electrode gap and generate a control signal to drive this error to zero. The choice of control law is not unique and for this application, a proportional control law was used.

The error between the set point and the estimate, e, is defined as, $e = \hat{g} - g_{ref}$ where $\hat{g}$ is the gap estimate and $g_{ref}$ is the gap set point (reference). Note that when the gap estimate is greater than the gap reference, the error is positive. A positive error indicates that the gap is too large, causing a positive downward velocity, as required.

The standard proportional control algorithm is of the form, $u = Ke$ where u is the control signal and K is the proportional gain. In this implementation, the control output is the desired ram velocity.

Once the measurement models were developed, the equations used to form the estimate of the electrode gap could be determined. The resulting filter was then tested off line using a computer and on line using an industrial VAR furnace.

Prior to implementing the filter on an industrial furnace, a set of simulations were run to verify that the filter was operating correctly. The simulations consisted of allowing the filter to process the data from the factor space experiment discussed above. The gap estimate provided by the filter just prior to a gap check was compared with the value of the gap check for 12 different experimental trials. The results of this simulation are summarized in Table 3.

| Actual Gap (mm) | Estimated Gap (mm) | Estimation Error (mm) | Drip Short Meas. Resid. | Voltage Meas. Resid. |
|---|---|---|---|---|
| 3.4 | 5.9 | 2.6 | 2.4 | 2.4 |
| 5.6 | ** | ** | 0.3 | 0.4 |
| 7.9 | 11.3 | 3.4 | 2.7 | 4.0 |
| 19.0 | 14.3 | -4.7 | -5.4 | -3.8 |
| 7.9 | 5.3 | -2.6 | 2.1 | 0.8 |
| 9.7 | 10.1 | 0.4 | 0.2 | 2.1 |
| 6.9 | 7.5 | 0.6 | -0.7 | 1.8 |
| 11.8 | 11.3 | -0.5 | -0.8 | -0.4 |
| 6.9 | 7.1 | 0.2 | -1.1 | 1.1 |
| 13.6 | 16.4 | 2.8 | 2.8 | 0.6 |
| 14.6 | 14.8 | 0.2 | -0.5 | -2.6 |
| 8.4 | 5.7 | -2.7 | -2.8 | -1.7 |
| Sum of Error Squared | | 63.15 | 64.9 | 55.9 |

**Estimate did not converge for this trial.

From this data, one can compare the relative accuracy of the Kalman filter to each of the measurement models. Ideally, the estimate provided by the filter should on average be more accurate than the estimate provided by either measurement separately. However, in reality this will not always be the case.

As can be seen from the data, the sum of the square of the errors for the filter is less than that of the drip short estimate, but greater than that of the voltage estimate. For these particular trials, the voltage estimate is on average providing a slightly better estimate of the electrode gap than the Kalman filter. However, the number of data points in each sample on which the filter was tested was relatively small (about 100 data points each), so the results in Table 3 might not be the best indication of the steady state filter estimate. From the data in Table 3, the filter was determined to be operating within reasonable limits. One can see that the estimation error was usually bounded by the errors in the measurement models.

The final stage of this project was the implementation and testing of the integrated estimator/controller on an industrial VAR furnace. The implementation involved the meshing of hydraulic, electrical, digital, and mechanical systems. The electrode ram was driven by a ball screw, which was in turn driven by a hydraulic motor through a gear train. The speed of the hydraulic motor was controlled by a hydraulic servo valve, the valve being driven by the output of a servo valve amplifier. A position control loop was used to control the ram through the servo valve amplifier. An absolute encoder was mounted onto the head of the ram, allowing for the feedback of the absolute ram position. The ram position feedback was compared to a position set point by the servo valve amplifier, which subsequently controlled the hydraulic servo valve using a proportional controller. The ram position set point was provided by the process control computer.

The process control computer digitized the furnace voltage and computed the drip short frequency and average voltage. The averaging, linearization, estimation, and control were all implemented in software on the control computer. While the controller in the computer specified a ram velocity, that signal was integrated and a reference position was sent to the servo valve amplifier at each time step.

In order to verify the correct operation of the process controller and choose the controller gains, an experimental melt was conducted. The experiment involved melting an 12-Cr steel electrode with a 16.75 inch nominal diameter into a 20 inch diameter crucible. The goal was to test the estimator and then the controller at several different current levels.

During the testing of the estimator, the gap estimates during the initial part of the experiment were found to be much greater than the actual gap. The problem was traced to the measurement models used in the linearization stage. For some reason, the relationship between voltage and gap was incorrect. The reason for the error is unknown, but could be related to the location of the voltage measurement on the furnace.

To compensate for the change in the voltage model, a new model was quickly developed during the testing of the estimator. When the parameters of the new model were used by the linearization stage, the estimates provided by the Kalman filter were in reasonable agreement with the actual electrode gap.

The newly developed voltage model indicated a voltage-gap relationship that was contrary to previous experience. The new voltage model implied that as the gap increased, the voltage decreased. This contradiction was most likely due to the noise on the measurements used to develop the new model and an insufficient number of data points. However, the effect of the error on the controller was minimal for several reasons. First, throughout the factor space experiment, the gap estimate provided by the drip short frequency estimate was always weighted more heavily than the estimate provided by the voltage measurement. Second, the controller gain was chosen so that the system would not respond to transients in the gap estimates, making the system response damped and minimizing instability caused by the incorrect voltage model. Third, the range of gap that the experiment was conducted in was relatively small (9 to 11 mm), thus making the error associated with the new model due to changes in voltage tolerable.

Once the voltage measurement model was modified, five gap checks were performed to verify the correct operation of the filter. The results of these gap checks are summarized in Table 4:

| Gap (mm) | Gap Estimate (mm) |
|---|---|
| 14.2 | 7.0 |
| 13.7 | 13.0 |
| 10.9 | 16.0 |
| 11.9 | 13.5 |
| 14.0 | 15.0 |

The filter did a reasonable job of estimating the electrode gap. Given the errors most likely present in the voltage measurement model, the values of the gap estimates are reasonable, with two exceptions. Other factors could have contributed to the large errors present in the first and third gap checks.

Several modifications were made to the process controller to overcome some unanticipated difficulties during the experiment. During the testing of the control system, the estimator was found to respond erratically to the low drip short frequencies present at high currents. The drip short frequency function is such that the drip shorts drop off rapidly above a certain gap. As the drip shorts approach zero, the gap estimate provided by the drip short signal becomes unrealistically large. In fact, as the drip short frequency average approaches zero, the gap estimate approaches infinity. Therefore, less emphasis should be placed on the drip short frequency at large gaps and high currents to prevent the gap estimate from being unrealistically large. One method of overcoming this difficulty is to ignore drip short frequency averages very close to zero.

The frequent occurrence of glows also created problems for the gap estimator. When a glow occurs, the arc potential would tend to drop, thus causing a large change in the gap estimate provided by the voltage model. In order to prevent the gap estimate provided by the Kalman filter from changing due to a glow, the gap estimate was held constant when a glow was detected. A glow was considered to be occurring when the drip short frequency dropped to near zero for a period of time.

In addition, at high currents and small gaps, very long drip shorts were sometimes counted as multiple drips. This multiple counting of shorts caused drip short frequency averages that were unrealistically large (>20 Hz). These large shorts would cause the gap estimate to be artificially small. In order to counteract this effect, drip short frequency averages above a certain value were ignored.

After the correct operation of the estimator was verified, the gap controller was brought on line and allowed to control the hydraulic valve amp. Various gains were tested to see which provided the best performance. The gain of the controller was chosen so that the system did not respond to sudden changes in the gap estimate.

Figure 16:
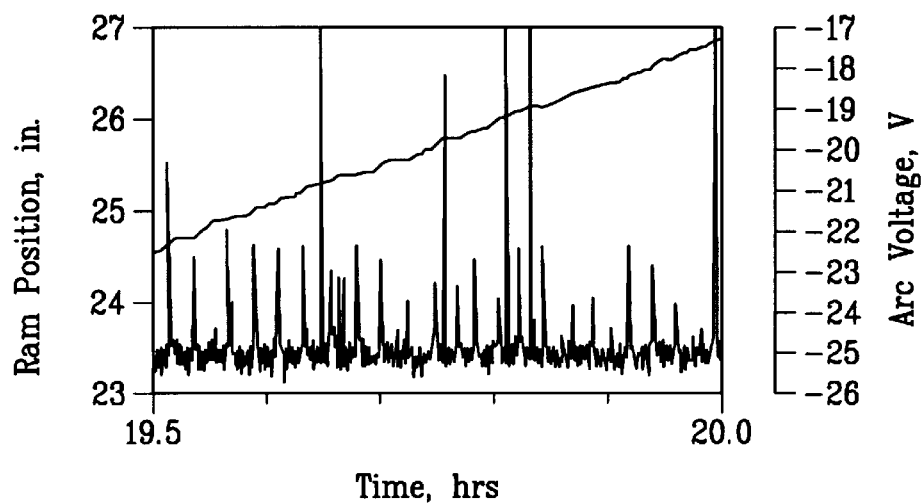
FIG. 16 is an exemplary plot of typical ram position (top) and arc voltage (bottom) data.

A second experiment was performed to allow the controller to operate during a typical industrial melt. A gap set point was chosen and the controller was allowed to operate without interruption. FIG. 16 shows a plot of the voltage and electrode position for a portion of the melt. The top line represents the ram position and the bottom line represents the arc voltage. This plot is typical of the controller operation during steady state melting.

As can be seen from FIG. 16, the furnace experienced a glow approximately every one or two minutes. The glows are indicated in the FIG. 16 by the positive going voltage spikes. An associated increase in furnace pressure was noted in the pressure data. The controller modifications discussed above allowed for relatively smooth ram travel in spite of these glows.

Figure 17:
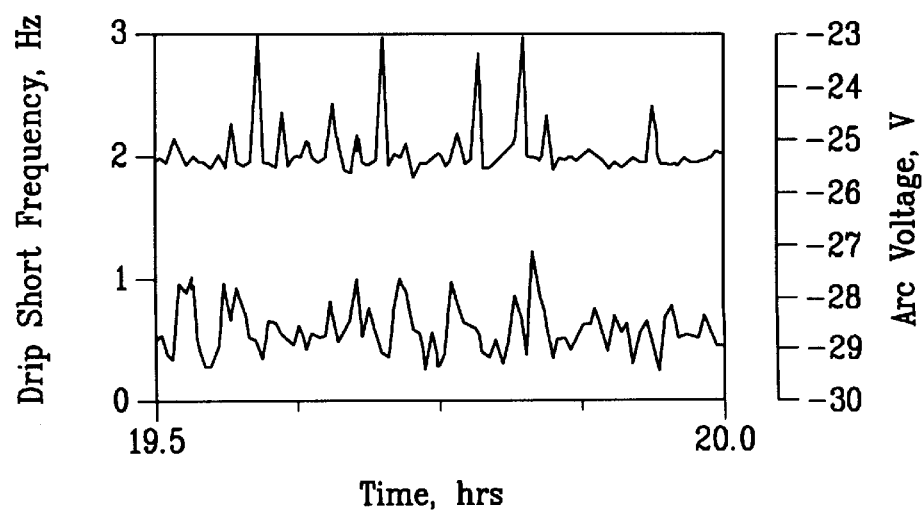
FIG. 17 is an exemplary plot of moving average values of voltage (top) and drip short frequency (bottom).

FIG. 17 shows the values of the moving averages of the voltage and drip short frequency for the same time interval covered by FIG. 17. The voltage and drip short frequency are the signals that were actually used to estimate the electrode gap. The effect of the glows, while not as pronounced, are still evident. Notice that when the voltage increases, indicating a glow, the drip short frequency decreases.

As can be seen from FIGS. 16 and 17, the electrode gap controller performs well even in the presence of glows. During the second melt, the controller and estimator operated correctly and controlled the furnace at 9 and 13 kA for several hours without any major difficulties.

The preceding example can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of controlling a vacuum arc remelting furnace, the method comprising the steps of:
    a) sampling a plurality of outputs of the furnace;
    b) calculating a plurality of secondary estimates of electrode gap from the plurality of outputs;
    c) deriving a primary estimate of electrode gap from the secondary estimates using a linear estimation filter; and
    d) adjusting an input to the furnace based on the primary estimate.

2. The method of claim 1 wherein the sampling step comprises sampling a plurality of outputs selected from the group consisting of drip short frequency, drip short period, arc voltage, ram velocity, ram position, electrode melt rate, arc voltage distribution properties, melting current, electrode weight, furnace pressure, cooling water inlet and outlet temperatures, arc light emissions, and electrostatic probe data.

3. The method of claim 1 wherein the sampling step comprises sampling a moving average of an output of the furnace.

4. The method of claim 1 wherein the calculating step comprises calculating a plurality of independent secondary estimates of electrode gap.

5. The method of claim 1 wherein the deriving step comprises deriving a primary estimate of electrode gap using a Kalman filter.

6. The method of claim 1 wherein the deriving step comprises providing adaptive gain input to the estimation filter to weight the secondary estimates differently in response to changes in state of the furnace.

7. The method of claim 1 wherein the adjusting step comprises adjusting an input having a linear relationship to the primary estimate.

8. The method of claim 1 additionally comprising the steps of detecting furnace process anomalies and adjusting an input to the furnace upon detection of an anomaly.

9. The method of claim 8 wherein the step of detecting furnace process anomalies comprises detecting anomalies selected from the group consisting of glows, electrode tip geometry changes, melt rate excursions, melting transients, furnace start up, and hot topping.

10. An apparatus for controlling a vacuum arc remelting furnace, said apparatus comprising:

means for sampling a plurality of outputs of the furnace;

means for calculating a plurality of secondary estimates of electrode gap from said plurality of outputs;

linear estimation filter means for deriving a primary estimate of electrode gap from said secondary estimates; and means for adjusting an input to the furnace based on said primary estimate.

11. The apparatus of claim 10 wherein said sampling means comprises means for sampling a plurality of outputs selected from the group consisting of drip short frequency, drip short period, arc voltage, ram velocity, ram position, electrode melt rate, arc voltage distribution properties, melting current, electrode weight, furnace pressure, cooling water inlet and outlet temperatures, arc light emissions, and electrostatic probe data.

12. The apparatus of claim 10 wherein said sampling means comprises means for sampling a moving average of an output of the furnace.

13. The apparatus of claim 10 wherein said calculating means comprises means for calculating a plurality of independent secondary estimates of electrode gap.

14. The apparatus of claim 10 wherein said deriving means comprises Kalman filter means.

15. The apparatus of claim 11 wherein said deriving means comprises means for providing adaptive gain input to said estimation filter to weight said secondary estimates differently in response to changes in state of the furnace.

16. The apparatus of claim 10 wherein said means for adjusting an input to the furnace comprises means for adjusting an input having a linear relationship to said primary estimate.

17. The apparatus of claim 10 additionally comprising means for detecting furnace process anomalies and adjusting an input to the furnace upon detection of an anomaly.

18. The apparatus of claim 17 wherein said means for detecting furnace process anomalies comprises means for detecting anomalies selected from said group consisting of glows, electrode tip geometry changes, melt rate excursions, melting transients, furnace start up, and hot topping.

* * * * *